United States Patent
Nath (12)

(10) Patent No.: US 7,818,117 B2
(45) Date of Patent: Oct. 19, 2010

(54) SYSTEM AND METHOD FOR INTEGRATING AND DISPLAYING TRAVEL ADVICES GATHERED FROM A PLURALITY OF RELIABLE SOURCES

(75) Inventor: Gourabmoy Nath, Antibes (FR)

(73) Assignee: Amadeus s.a.s., Biot (FR)

( * ) Notice: Subject to any disclaimer, the term of this patent is extended or adjusted under 35 U.S.C. 154(b) by 167 days.

(21) Appl. No.: 11/765,633

(22) Filed: Jun. 20, 2007

(65) Prior Publication Data

US 2008/0319649 A1 Dec. 25, 2008

(51) Int. Cl.
*G01C 21/00* (2006.01)
(52) U.S. Cl. .............................. 701/201; 701/205; 705/8
(58) Field of Classification Search ................... 701/205
See application file for complete search history.

(56) References Cited

U.S. PATENT DOCUMENTS

| | | | |
|---|---|---|---|
| 6,842,737 B1* | 1/2005 | Stiles et al. ...................... 705/6 |
| 7,212,113 B2* | 5/2007 | Zanovitch .................... 340/540 |
| 2004/0039603 A1* | 2/2004 | Hanrahan ....................... 705/2 |
| 2004/0078335 A1* | 4/2004 | Calvesio et al. ............... 705/50 |
| 2005/0182640 A1* | 8/2005 | Takano et al. ................... 705/1 |
| 2005/0203970 A1* | 9/2005 | McKeown et al. .......... 707/203 |
| 2007/0016439 A1* | 1/2007 | Stiles et al. ..................... 705/1 |
| 2007/0273499 A1* | 11/2007 | Chlubek et al. ............. 340/521 |
| 2008/0010352 A1* | 1/2008 | Donoho et al. .............. 709/206 |
| 2008/0027749 A1* | 1/2008 | Meyer et al. .................... 705/1 |
| 2009/0055753 A1* | 2/2009 | Balevic et al. .............. 715/747 |
| 2009/0125361 A1* | 5/2009 | Rossi ............................. 705/8 |
| 2009/0281856 A1* | 11/2009 | Meyer et al. .................... 705/7 |

FOREIGN PATENT DOCUMENTS

WO 00/49517 8/2000

OTHER PUBLICATIONS

Ahmed A. Mohamed, "Generating User-Focused, Content-Based Summaries for Multi-Documents Using Document Graphs", Signal Processing and Information Technology, Dec. 18, 2005, pp. 675-679, IEEE, Piscataway, New Jersey.

(Continued)

*Primary Examiner*—Mark Hellner
*Assistant Examiner*—Helal A Algahaim
(74) *Attorney, Agent, or Firm*—Young & Thompson (57) ABSTRACT

A computerized travel system and a method for providing advices and warnings per travel destination to end-users. The system has a client service module for receiving queries from the end-users, and delivering to them merged reports of travel advices and warnings for the queried travel destinations. A download and parsing module parses travel raw documents, downloaded from a plurality of online reliable travel sources, into cleaned raw documents sharing a common formatting structure including sections, sections headers and paragraphs. An algorithmic module integrates the cleaned raw documents into the merged reports of travel advices and warnings per travel destination. The integration is performed from a base document chosen among all the relevant clean raw documents for each queried travel destination. Comparable sections are determined on the basis of contents of their section headers and semantically close paragraphs are placed next to each other in corresponding sections of merged reports.

20 Claims, 4 Drawing Sheets

OTHER PUBLICATIONS

Sanda Harabagiu et al., "Satisfying information needs with multi-document summaries", Information Processing & Management, Mar. 13, 2007, vol. 43, No. 6, pp. 1619-1642, Elsevier, Barking, Great Britain.

Frank S.C. Tseng et al., "The concept of document-warehousing for multi-dimensional modeling of textual-based business intelligence", Decision Support Systems, Nov. 1, 2006, vol. 42, No. 2, pp. 727-744, Elsevier Science Publishers, Amsterdam, The Netherlands.

Paul S. Jacobs et al., "SCISOR: Extracting Information from On-line News", Communications of the Association for Computing Machinery, Nov. 1, 1990, vol. 33, No. 11, pp. 88-97, ACM, New York, NY.

\* cited by examiner

SYSTEM AND METHOD FOR INTEGRATING AND DISPLAYING TRAVEL ADVICES GATHERED FROM A PLURALITY OF RELIABLE SOURCES

FIELD OF THE INVENTION

The present invention generally relates to a method and system for gathering, integrating and delivering information to travelers about their travel destinations. It is more particularly aimed at providing travel advices gathered from a plurality of selected online reliable sources and delivered under the form of a semantically organized merged report whose contents can be further filtered for display.

BACKGROUND OF THE INVENTION

For the millions of travelers around the world planning to visit foreign countries for business or leisure, often for the first time, the problem arises to have to collect all sorts of travel information about their destination before departure. If part of the collected information cannot jeopardize a trip, and just make it more or less enjoyable and/or costly if it appears to be eventually wrong or inadequate; it remains that information about safety and security conditions, health questions and entry requirements is crucial and cannot be overlooked under the penalty of experiencing severe problems while traveling. However, travelers are often left alone with the task of collecting at least a significant part of this key information even though they can receive some help of their airline or travel agent if they have booked their trip through a traditional travel agency. Often, nowadays, trips are also booked online without human intervention. Travelers can then only rely on whatever warnings and advices have been prepared for their current travel destination by those in charge of the site of the online travel provider, if some are indeed actually provided. Moreover, individual travelers have generally no a priori idea of what information is important to know about their destination and from where they can get it, beyond the fact they generally think to refer to some official sites of their citizenship or residence country like the ones put in place by most country department of foreign affairs and other government or international official sites that travelers may know of, like the World Health Organization (WHO) the United Nations (UN) public health arm. Nevertheless, even if travelers have been able to collect some of the necessary information about their travel destinations they cannot be sure that the disparate set of documents they have collected contains all they must be aware of before departing. Thus, there is a need for a travel system capable of automatically delivering upon request of a traveler a comprehensive and synthetic set of current travel advices and warnings collected from a plurality of reliable sources for a given travel destination.

SUMMARY OF THE INVENTION

The system and method of the present invention meet the above need and describes a computerized travel system and a method for providing advices and warnings per travel destination to end-users of the travel system. To this end, system of the invention has a client service module aimed at receiving queries from the end-users, and at delivering to them merged reports of travel advices and warnings for the queried travel destinations. A download and parsing module is used to parse travel raw documents, downloaded from a plurality of online reliable travel sources, into cleaned raw documents sharing a common formatting structure including sections, sections headers and paragraphs. An algorithmic module integrates the cleaned raw documents into the merged reports of travel advices and warnings per travel destination. The integration of the cleaned raw documents into merged reports is performed from a base document chosen among all the relevant clean raw documents for each queried travel destination. Comparable sections are determined on the basis of contents of their section headers and semantically close paragraphs are placed next to each other in the corresponding sections of the merged reports.

It is therefore a main object of the invention of providing a comprehensive merged report of travel advices and warnings to travelers by aggregating, without any loss of information, document contents from multiple reliable online travel advice sources.

It is a further object of the invention to obtain that aggregation of the information be not just a physical appending of all gathered individual documents but is rather a semantically organized merged report where section paragraphs with high semantic similarities are close to each other.

It is also an object of the invention to allow filtering of the merged reports and individual travel advice documents, for printing or display, on the basis of semantic filters to view only e.g., recommendations or events.

It is yet another object of the invention to describe a system that can be imbedded in a larger travel system or can operate as well in a stand-alone mode with loose coupling with other travel systems from which it could be invoked.

Further objects, features and advantages of the present invention will become apparent to the ones skilled in the art upon examination of the following description in reference to the accompanying drawings. It is intended that any additional advantages be incorporated herein.

DETAILED DESCRIPTION

The following detailed description of the invention refers to the accompanying drawings. While the description includes exemplary embodiments, other embodiments are possible, and changes may be made to the embodiments described without departing from the spirit and scope of the invention.

The invention describes a travel advice builder (TAB) aimed at gathering and integrating travel related information from reliable sources. Especially, TAB is intended to collect all sorts of travel warnings and advices available from authoritative sources such as government official sites, country tourism offices, consulates and embassies and destined for travellers preparing a trip or while they are travelling. Travel advices may include, but are not limited to, up-to-date information on local state of affairs, health and sanitary conditions, recent incidents, possible risks, terrorist threats, relevant precautions and recommendations concerning a given destination or a country. Moreover, the gathered travel information and advices can be filtered with semantic filters so that to display only, e.g., recommendations (such as what to do or what to avoid at destinations considered) or local events.

Figure 1:
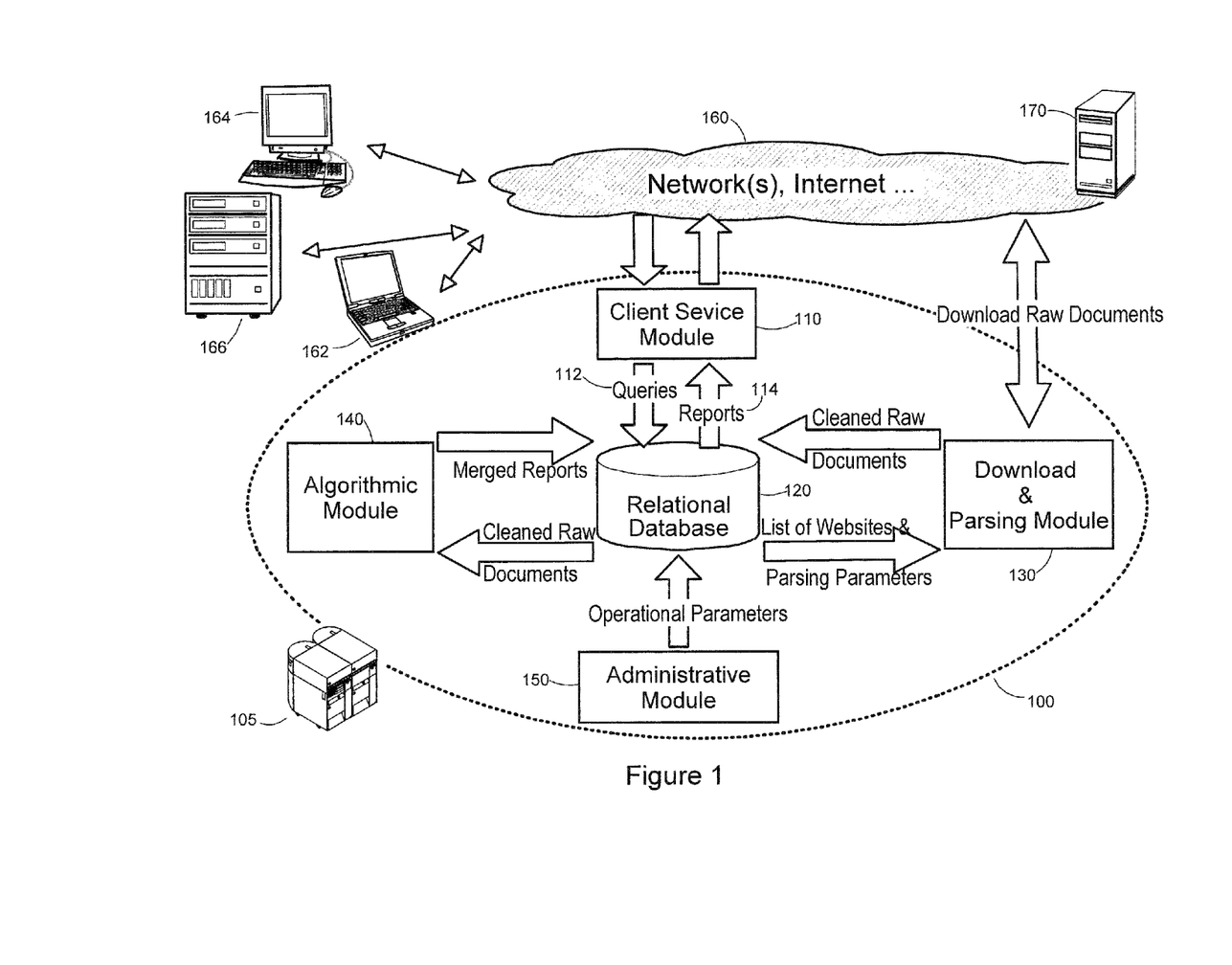
FIG. 1 depicts a travel advice system according to the invention in its environment.

FIG. 1 depicts a system (100) including the means necessary to carry out the invention. Such a system can be run from current various stand-alone computer resources (105) so that to deliver the corresponding services directly to the travelers, e.g., under the form of a specialized website or, indirectly, on behalf of traditional (i.e., travel agents) and online travel service providers. It may be as well imbedded in a larger computer system like the ones put in place by a few global distribution systems (GDS's), such as AMADEUS, a worldwide service provider for the travel industry.

A system according to the invention (100) is comprised of five modules as follows:

A client service module (110) aimed at receiving end-user input requests, i.e., client queries (112) typically comprising the destination country and citizenship of travelers. In response to client queries, output of the client service module consists of various reports (114), including merged reports and citizenship-specific reports, possibly in a compressed form, put together by the system of the invention as it is further described in the following description.

A relational database (120) to store all the data necessary to operate the invention including various reports for all destination countries that are source specific, the merged reports produced by the algorithmic module (140), the criteria used to parse the raw documents got from different sources of travel information, the list of websites that serve as travel information sources and from where travel raw documents are downloaded.

A download and parsing module (130) aimed at downloading the travel raw documents from the list of selected reliable websites stored in the corresponding table of the relational database (120). Downloaded raw documents are then parsed on the basis of the source specific parsing criteria also stored in the relational database. Outputs of this module are the cleaned raw documents that serve as inputs to the following algorithmic module.

An algorithmic module (140) to process the here above raw documents and produce the merged reports to be stored in the relational database and destined for the travellers. Hence, the algorithmic module is the key component of the invention achieving the integration of the travel information gathered from the selected reliable sources. Operation of this module is further described in the following figures.

An administration module (150) which, as the name suggests, is used to configure, control and monitor a system according to the invention performing all standard administrative tasks, error handling and reporting necessary to operate and to maintain it.

As far as its environment is concerned the system of the invention (100) is made capable of communicating with various remote software applications through any combination of private and public networks (160) including the Internet. To this end it uses standard means and protocols such as TCP/IP, the network and transport suite of protocols of the Internet. System can thus interface through the client service module (110) with remote individual end-users from their personal computers (162) generally using any of the available software applications (browsers) used to navigate on the Web, the ubiquitous application of the Internet and of many other private networks. System of the invention can as well communicate with corporate travel systems (164) such as the ones put in place by various travel service providers and GDS's (166) already discussed above. And, as already mentioned too, raw travel documents are downloaded from selected websites run anywhere in the world from their own remote computing platforms (170).

Figure 2:
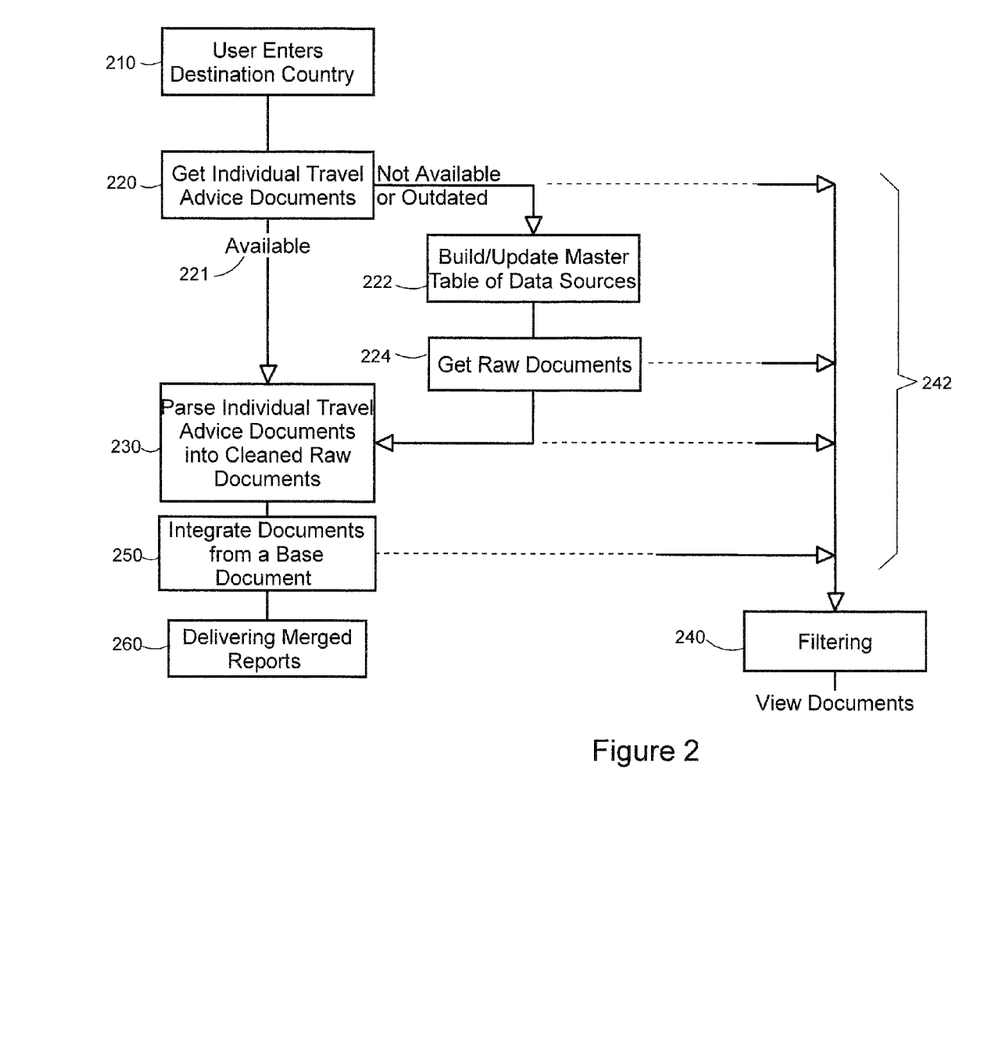
FIG. 2 describes the steps of the method of the invention to produce and display a semantically organized merged report of travel advices and warnings.

FIG. 2 is the flow chart of the processing steps performed by the system of the invention to integrate the gathered travel information in order to produce the merged reports.

End user of the system is first assumed to enter a valid travel destination, generally under the form of a country name (210), or of any travel destination that system can recognize. Destination name checking is performed by interrogating the corresponding database table that stores the list of supported countries (possibly including all countries in the world) and other regional or thematic destinations that have been defined by system designers. Optionally, end-user may have to enter further information such as the citizenship of traveller(s) so as integration of the raw travel documents can be conducted differently depending on their nationality and origin. For example, visas are requested or not depending on the citizenship of applicants and specific health precautions may have to be taken if travelling from certain countries.

If a valid destination has been entered then the system checks whether the corresponding raw documents from each of the individual predefined data sources already exist in the database and if they are not outdated. If this is indeed the case the corresponding documents need not to be downloaded and one may proceed directly to step (230) here after.

However, if not all documents are in the database and/or are outdated the following two steps need to be executed.

The invention assumes that a master table of reliable data source links per country or valid destination, as discussed above, has been first built in relational database (222). This table is managed through the administrative module by an administrator of the system. Table stores the names and the master Web page addresses, i.e., the uniform resource locator or URL of each of the selected data sources. Furthermore, master URL of each data source is possibly further augmented with additional paths pointing to travel advice pages for the corresponding destination or country. An information harvester, by reading and parsing the master page, can thus augment a master URL with paths corresponding to each country for which the data source can provide travel advice. Hence, if a data source master URL is for example: www-.data.com, it is potentially the root of travel advices for many countries and possibly for all countries. In which case the exact URL for a particular destination country called D may be, e.g.: www.data.com/D or other paths like: www.data.com/travel_advice/103456.html. This information is stored in the data source country table. Each row corresponds to a country followed by the relative URL of the destination country. Step (222) is typically executed the first time the system is run and also, possibly, at regular intervals or whenever raw documents are found missing or outdated at step (220) so as to populate the relevant columns of the data source-country table in the relational database and, also, to keep their contents current while TAB is up and running.

As a result of the execution of step (222) the links for each data source are thus known and the corresponding raw documents can be downloaded. Downloads occur under the control of the underlying protocol used by the Web, i.e., HTTP which stands for 'hypertext transfer protocol'. HTTP defines how messages are formatted and transmitted over the Internet and other public or private networks using the TCP/IP suite of protocols. This is achieved from TAB system through standard application program interfaces or API's so that travel information can be downloaded from each selected data source and raw documents, eventually stored in database tables on the basis of their corresponding country or travel destinations, become available for being further processed. Documents are in HTML, which stands for 'hypertext markup language', the authoring language used to create documents on the Web. HTML defines the structure and layout of a Web document by using a variety of tags and attributes.

Whichever individual raw documents were already available (221) in database or have just been downloaded as a result of the execution of steps (222) and (224) just described; next step, i.e.: step (230), consists in parsing the raw documents. This is achieved by the download and parsing module shown in FIG. 1.

The key objective of the parsing step (230) is to obtain that all the individual documents providing travel advices for each of the destination countries have eventually the same HTML structure so that they can later be much more efficiently analyzed by the algorithmic module previously discussed. Because the different selected Web data sources are likely to have very different HTML structures, since they have been prepared by organizations (e.g., country embassies, consulates, etc.) that have nothing in common, the parsing module is devised to convert the contents and the different information organizational structures into a common simple hierarchy comprised of sections, headers and paragraphs. This is merely achieved in HTML by those skilled in the art through the selection and use of a few appropriate tags. Hence, once converted, the individual downloaded travel documents have identical simple structures allowing a straightforward extraction of the text between the tags used to format them. Each paragraph can then be straightfully parsed in terms of a list of sentences.

To help achieving this key objective of the parsing module and allow implementing an efficient conversion of the downloaded raw documents, table of countries in relational database remembers their structures on the basis of their sources. Hence, HTML structures, i.e., the tag structures are stored (e.g., under the form of templates) for each selected different source of travel information. The information organization, the HTML structure, is anticipated to be exactly the same for each country for which a given data source actually provides travel information. Deriving these tags once for all, and after any major structure change of the Web sources, is sufficient. Since the number of data sources considered by the invention is much smaller (typically, 4 or 5) compared to the number of countries (there are about 190 independent countries in the world), these tags are often derivable by human inspection of a few downloaded documents using a mark-up structure viewer (e.g., an extended mark-up language or XML viewer). Automated methods are also feasible. Among them, standard wrapper induction techniques that use inductive learning methods can be applied in order to automatically derive the tags of a given data source. Therefore, a data source relational database table stores these tags for each data source. Given a document that is to be parsed, its relevant tags are obtained from this data source table. It is then easy to extract the contents between these tags to derive the organizational structure of the downloaded document. All other extraneous HTML tags, except hypertext links, might be cleaned away. At the end of this phase, each document section header, section and paragraph structure along with their contents is thus fully established.

The next processing step (250) performed by the system of the invention is the step where integration of the individual downloaded raw documents (cleaned by the download and parsing module as explained in the previous step) is finally performed to produce the merged reports destined for the travelers as discussed in FIG. 1 to whom they are eventually delivered (260). This step is described in detail in FIG. 3 and FIG. 4 that follow.

The purpose of step (240) that appears in FIG. 2 is to filter the contents of the various individual and merged documents that are manipulated and produced by the system of the invention. Step (240), i.e., filtering, can be invoked at any stage of the process (242) to allow end-users viewing only part of the gathered travel information in the current active document, i.e.: the document being viewed. The simplest filtering operations are those that display particular sections of paragraphs of an active document to structure it for display. However, semantic filters, i.e.: filters based on the meaning of the text can be invoked for the purpose of displaying only specific information contained in the active document. A semantic filter is, e.g.: "Show all recommendations (things to do or avoid) of the current travel advice". The following text, where X is the name of a country and Y is the name of a city, is an example of a raw text to be filtered:

There is an ongoing risk of terrorist activity in X by militant groups. We advise you to exercise caution and monitor developments that might affect your safety in X because of the risk of terrorist activity by militant groups. Pay close attention to your personal security and monitor the media for information about possible new safety or security risks. Attack targets could be prominent government buildings, national institutions, places of worship, public transport, airports and aircraft, religious sites and festivals and tourist sites. There have been incidents of mob violence in town Y since November 2003. In October 2005, three bomb blasts hit tourist areas in Y, resulting in 59 deaths and over 300 injuries.

If we apply the above semantic filter one obtains:

We advise you to exercise caution and monitor developments that might affect your safety in X because of the risk of terrorist activity by militant groups. Pay close attention to your personal security and monitor the media for information about possible new safety or security risks.

Another semantic filter could be, e.g.: "Show all events". In which case what is displayed becomes:

There have been incidents of mob violence in town Y since November 2003. In October 2005, three bomb blasts hit tourist areas in Y, resulting in 59 deaths and over 300 injuries.

Many other semantic filters are obviously possible. For example, a legal filter might just retain sentences concerning law items, penalties or fines. In the same spirit a crime filter could be utilized for data sources that do not have a specialized crime section.

Implementation of the filtering according to the invention is done in a manner similar to SQL, the de facto standard language used to create, update and query records from a relational database. Like SQL a SELECT command allows to filter what is to be displayed. Following examples illustrate how filtering can be requested from TAB:

SELECT sentences from active document where sentence contains a recommendation.
SELECT paragraphs from active document where paragraph contains a recommendation.
SELECT sentences from active document where sentence contains an event.
SELECT paragraphs from active document where paragraph contains an event.

Any semantic filter, whichever it is an event or a recommendation as in the above examples or is something else, is defined by a signature. The signature for a recommendation filter must be part of a keyword set. For example, some of the terms in the keyword set of signatures for a recommendation filter are, e.g., as follows:

{Tell, Get, Keep, Use, Do not, Check, Pack, Avoid You should, You must, Travellers, Visitors, Exercise caution, Pay attention, Pay special attention, are reminded, are warned, your responsibility, strongly recommend, strongly advise}

Once, a keyword set is defined either manually or with automated means, the filtering operation simply consists in checking whether any of the single-word keywords or multi-word sequences is indeed present in a text element i.e.: a sentence or a paragraph. Because travel advice documents are well written and validated texts it is worth noting that lower and upper case letters can be taken into consideration for filtering. Hence, capital letters in the above keyword means that they match the beginning of sentences.

An event filter on the other hand is defined by a signature characterized by a date. The dates appear in sentences under different forms, e.g.: {Jan 99, January 99, January of 1999, 3rd January 1999, etc.}. As soon as one of the possible grammatical forms of a date is detected in the text element (paragraph or sentence) it can be classified as an event.

One advantage of the travel advice domain is that there tends to have in the raw documents a lot of signature repetitions for a given filter across different countries. This permits to quickly formulate a knowledge-based signature set of text documents for a given semantic filter that is effective over a large range of destination countries. Also, maximum length of multi-word sequences in keyword set is in practice very limited for the application domain considered thus preventing TAB from having to examine long sequences of words. One, two and three-word sequences are generally sufficient as illustrated in the example shown here above of a filtering keyword set. Finally, formulating a grammatical pattern that best implements the semantic filter to apply in order to obtain a given filtering can be facilitated by heuristic observations of positional occurrences of certain multi-word sequences, e.g.: occurring only near the beginning or at the end of sentences.

Figure 3:
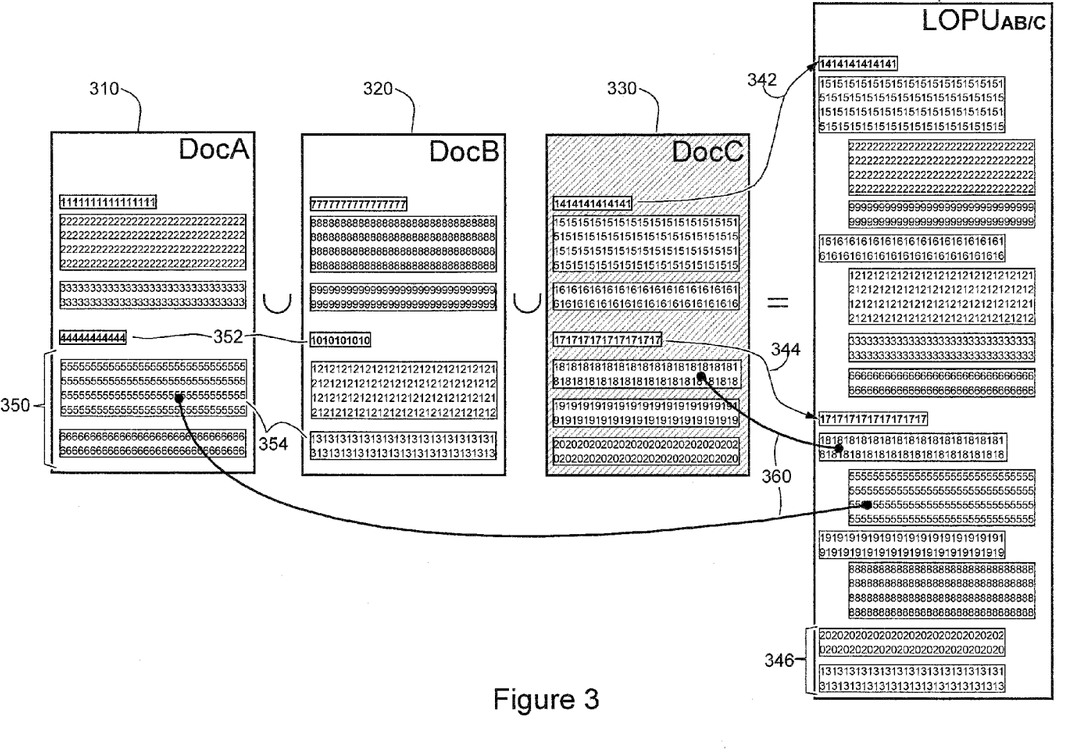
FIG. 3 illustrates through an example how a merged report of travel advices is build out of individual documents downloaded from reliable sources of travel information.

FIG. 3 describes through an example the integration of individual raw documents into a merged document according to the invention.

The integration of the raw document contents for the synthesis of the new document is done with respect to one of the raw document designated as the base document. DocA (310), DocB (320) and DocC (330) are the parsed and cleaned travel advice documents after step (230) described in FIG. 2 has been applied. The documents, coming from different data sources, are referring to a same given country or destination. In this example this is DocC (330) which is chosen to play the role of base document. As explained previously, the parsed and cleaned documents have all a simple HTML structure only made of sections, section headers and paragraphs. Examples of which are respectively designated by following references: (350), (352) and (354). Ideally, the objective of the integration step would be to produce a true semantic union of the raw documents. However, a true semantic union, which can be defined as one with no missing information from each document and absolutely no redundancies left, is still only possible when done by a skilled human editor. What an automatic mechanism can reasonably produce, without requiring an unacceptable amount of computing resources; can only tend towards a semantic union. In other words, at one extreme, a physical union would be a simple append of the all individual documents, one after the other, which is obviously straightforward to implement and requires very few computational resources. At the other extreme we would have a true semantic union which, if indeed feasible, would require anyway nowadays much too many computational resources for practical applications. Hence, the integration step of the invention is conducted as follows to produce a merged document, semantically organized, without any loss of information:

In the merged document (340) semantically close paragraphs are grouped in adjacent physical proximity. Example of this is shown by reference (360) where a paragraph of DocA (5555 . . . ), found semantically closed to the first one (18181818 . . . ) of second section of base document (330), are made physically close to each other in merged document.

The organizational structure of one of the individual documents is chosen to act as a template for forming the union. This is the base document (330) already mentioned which is chosen in this example. For the domain of travel advices the base document (DocC) can be from any data source the user prefers. For example, if the traveler is an US citizen, the base format could be the one supplied by the US embassy for the selected destination and within which the clips from other documents are inserted. Hence, section headers of DocC (342, 344) are retained to be the section headers of the merged document (340).

No attempt is done to eliminate redundancies if any exist between the semantically close paragraphs. Unrelated sections are put at the end (346).

Therefore, what is obtained is a logically organized physical union of documents A, B and C on the basis of DocC and referred to as LOPUAB/C (340). LOPU is not intended to be displayed as is. As already discussed in FIG. 2, and more specifically at step (240), filtering is generally applied over documents to display only part of their contents. The ways of displaying the related sections to improve readability is application dependent and may depend whether they are viewed on display monitors or printed. Other display methods may be considered like all sorts of hierarchical and tree-view methods and various mouse-over tool-tip methods.

The benefits of reorganizing documents in a LOPU are many fold. The integration with respect to a base document is often very efficient particularly in the travel advice domain because travellers are more likely to be primarily interested with advice from their preferred data source (e.g.: advices from their own government) and would like to view related paragraphs from other documents in the light of their preferred document. By placing semantically close paragraphs together, the user is able to pick out quickly the differences between the similar paragraphs to gain a more holistic idea behind the paragraphs theme. Also, comparing complete paragraphs having semantic redundancies (while wording and language expressions used can be very different) may emphasize the importance of certain aspects, because of the semantic repetitions, so that readers are more likely becoming aware and careful on them. In addition the closely related paragraphs can be conveniently considered for a summarization process if necessary. One or two sentences from each cluster of semantically closed paragraphs can be conveniently extracted to contribute to the overall summary. Finally, just by reformulating the problem in this convenient form (i.e., a LOPU), we vastly decrease the complexity of producing a full global integration of documents in which we would have to compare all possible pairs of paragraphs in all documents. Comparison can here be limited to compare only semantically close paragraphs.

Figure 4:
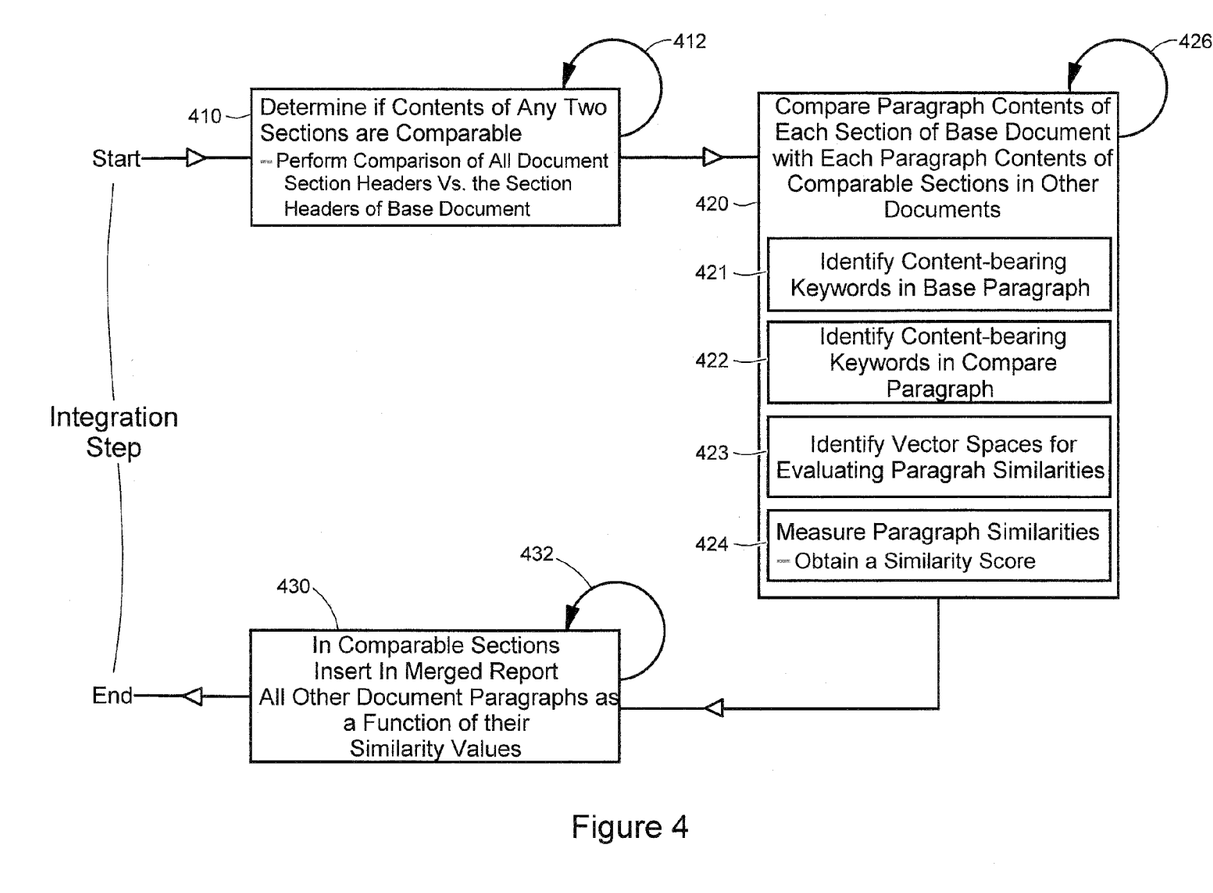
FIG. 4 describes the details of the integration step of the method of the invention.

FIG. 4 further describes the sub-steps of the overall integration step, i.e.: step (250) discussed in FIG. 2.

Sub-step (410) is aimed at determining if contents of two sections are comparable on the basis of their section headers. If headers have similar information contents the section are assumed to be comparable. Comparison of section headers is performed between all section headers of the individual documents (but the one designated as being the base document) and the ones of the base document until comparisons are exhausted (412). To detect if two section headers have similar information contents the following procedure is used:

Identify content-bearing keywords in the two headers:
Identify proper and common nouns, verbs and adjectives to form two keyword lists.
Eliminate 'noise' words (common nouns, e.g.: I, We; verbs, e.g.: have, be; as well as liaison words). Noise words are words which are commonly used in any text regardless of subject and do not help or helps little to distinguish between the main semantic content and the semantic theme of two pieces of text.

This is also generally the case in the following description of the invention unless otherwise specified. Then, sub-step (410) proceeds as follows:

Tokenize P1 and P2 to form two multi-sets of keywords (i.e., sets in which items can be repeated). Call them w (P1) and w (P2).
Compute the intersection set of the multi-sets and call it w (P1) ∩ w (P2). The number of elements in the set is: n (w (P1) ∩ w (P2)).
Compute the union of the multi-sets and call it w (P1) ∪ w (P2). The number of elements in the set is: n (w (P1) ∪ w (P2))

In computing the above intersection and union of multi-sets, syntactic and semantic equivalences are considered. Two sectional header keywords are assumed to be semantically equivalent if they are present in an equivalence data dictionary stored in tables of the relational database of the system. Also, as already discussed, keywords may be single, double and, generally, n-word keywords as defined by the data dictionary.

Then, similarity (P1, P2) is: n (w (P1) ∩ w (P2))/n (w (P1) ∪ w (P2)). Similarity is thus the number of common keywords divided by the total number of keywords of headers being compared. Hence, similarity value is 0 if they have nothing in common and 1 if they share all the keywords. If similarity value exceeds a predefined threshold the two sections are said to be comparable on the basis of their headers.

It is worth noting here that section headers in the travel advice domain have been found to be very short, generally comprised of only a few words and characterized by the use of a same set of keywords or synonymous keywords. In addition the complete union set of section headers for all possible data sources was found to be extremely small and bear a high degree of commonality. Hence, such detection is knowledge-based and takes place at both syntactic and semantic levels, with the semantic comparison is based on an equivalence data dictionary. At the syntactic level exact spelling is used to identify common words. At the semantic level the data dictionary is used to assign equivalence between them.

Sub-step (410) having determined which sections in documents are comparable following sub-step of the overall integration step, i.e.: sub-step (420), is aimed at comparing the n paragraphs of each section of the base document with each of the m paragraphs in the comparable sections of the other documents untill paragraph comparisons are exhausted (426). The paragraph of the base document, and the target paragraph in another document to which it is being compared, are hereafter respectively referred to as the base paragraph and the compare paragraph. In general, in travel advice documents, the number of paragraphs n and m are small. And, because they are also very well edited the average number of words in a paragraph is anticipated to be small too (typically, 150 words or less).

While paragraphs are being compared, sub-step (420) first identifies content-bearing keywords in base paragraph (421). Words which convey the most semantic information in text sentences, i.e., verbs, nouns (proper nouns and common nouns) and adjectives, are extracted. While this can be achieved by applying a standard part-of-speech or grammatical tagger (i.e., a software to identify words as nouns, verbs, adjectives, etc) the invention follows a simpler and easier way in rather eliminating all single and multiword liaison phrases via a data dictionary. The eliminated word set will include articles (the, an, a), pre and postpositions (for, from, in, inside, into, to, next ago, apart, aside, away, hence, notwithstanding, on, up, down, through, etc), conjunctions and adverbs (a simple rule is words ending with 'ly', e.g.: luckily, happily etc). Thus, remaining words are verbs, nouns and adjectives. In addition, invention also uses any standard named entity recognition (NER) algorithm to distinguish proper nouns from common nouns. Then, all keywords except those that are identified as named entities are reduced to their morphological root using a standard stemming algorithm like Levin's stemming algorithm.

The following is an example of what sub-step (421) can achieve to identify content-bearing keywords on following base paragraph about travel advice to France:

In Paris, at Charles de Gaulle airport or at the Gare du Nord railway station, you should protect your baggage against theft and beware of pickpockets. Thieves and pickpockets also operate on the Paris Metro and RER (suburban) lines especially RER line B, which serves Charles de Gaulle and Orly airports and the Gare du Nord. Thefts have also occurred at Nice Airport, particularly at the car rental car parks where bags have been snatched as drivers have been loading luggage into hire cars. Pedestrians should beware of bag snatchers operating both on foot and from motorcycles.

Result before stemming is as follows. The numbers between parentheses indicate the frequency of use of corresponding keywords in above text.

{Paris(2), Charles De Gaulle(2), airport(3), Gare du Nord (2), railway, station, protect, baggage, theft(2), beware (2), pickpocket(2), operate(2), metro, RER(2) suburban, line(2), serve, Orly, occur, Nice, car(3), rent, park, bag (2), snatch(2), driver, load, luggage, hire, pedestrian, foot, motorcycle, B}

After stemming some of the words in the set above are replaced by their morphological roots (e.g. operate and operating will both change to operat). The next sub-step (422) does the same thing over the text of a paragraph to be compared and coming from another document.

There is a high incidence of petty crime, especially bag snatching, and pickpocketing, throughout France particularly on the streets of larger cities such as Paris, Marseilles and Nice. Airports, public transport, tourist areas, and beaches are prime targets for thieves who frequently work in gangs, using a variety of methods to distract potential victims. There are frequent reports of crime, including robbery and muggings, on the train system servicing Roissy, Charles-de-Gaulle and Orly Airports. Increasingly, such crime is being accompanied by acts or threats of violence. There is a growing incidence of violent attacks against tourists by groups of young people, usually occurring late at night around major tourist attractions such as the Champs-Elysees, the Les Halles district and the Latin Quarter in central Paris.

Content-bearing keywords are extracted in a similar manner. Result is as follows. In this example one will notice that 'violen' is the result of the stemming of 'violence'.

{high, incidence(2), petty, bag, snatch, pickpocket, France, street, large, city, Paris, Marseilles, Nice, airport(2), public, transport, tourist, area, beach, prime, target, thieves, work, gang, variety, method, distract, potential, victim, frequent, report, crime(3), rob, mug, train, system, service, Roissy, Charles-de-Gaulle, Orly, accompany, act, violen(2), threat, violence, attack, tourist(2), group, young, people, occur, late, night, major, attraction, Champs-Elysees, Les Halles, district, Latin Quarter, central, Paris}

Then, next sub-step (423) consists in identifying vector spaces for evaluating similarities between the base paragraph and the compare paragraph. Once the content-bearing keywords have been identified in both paragraphs the comparison process can begin. The principle of comparison is as follows.

Each word in the base paragraph represents an axis of dimension. If, e.g., we have 150 words in the content-bearing keyword representation of the base paragraph this implies we have 150 dimensions. The entire text is a linear combination of these dimensions, the linear weights or coefficients of each axe correspond to the frequencies of the words. Thus the entire text is a vector in this space.

The compare paragraph has a different set of dimensions determined by the number of unique words, e.g.: 80; with some dimensions in common, e.g.: 7 exact common words. Similarly, it is thus a vector in this 80-dimension space.

To compute similarity, the union of the dimensions of the base paragraph and compare paragraph vectors is considered. In this example the union of dimensions gives: (150−7)+7+(80−7)=223. Thus, union is a 223-dimension space. In this space, a standard practice of text mining to estimate similarities consists in computing the cosine angle between the base paragraph vector and the compare paragraph vector. If the two vectors are exactly the same, the angle between them is 0 and cosine value is 1 (they share exactly the same keywords). If the vectors are completely different, they are orthogonal in the space and cosine value is 0 (they have no keyword in common).

However, prior to the application of the above comparison principle, the invention attempts to reduce the space dimensions to be computationally more efficient in working on a semantic content-bearing comparison space that is a subspace of the above paragraph spaces. To this end, first, rare dimensions are eliminated. What is rare or common depends on whether a particular keyword is used by the other selected travel advice documents for the same country. To do this, the invention tabulates the frequency of the keywords in the contents of each data source for the same country. Those of the keywords having a frequency of 1 can be considered as rare in the space of travel advice of the given country and are eliminated. Then, to further reduce space dimensions, lexically close keywords are merged into a single dimension. This is achieved by a lexical equivalence map that is constructed for the travel advice domain by a human being. Therefore, following keywords, which are not covered by the stemming algorithm, are however merged in a single dimension, e.g.:

Bag versus baggage;
Theft versus thieve, thief

The lexical equivalence map and a semantic association map are aggregated and put in a text file that is checked to reduce space dimensions. The semantic association map enables the comparison space to be oriented towards semantic concepts pertaining to the travel advice domain with the goal of making similarity values as meaningful as possible. Fine tuning of similarity assessments is then possible if different travellers have their demands expressed in different ways. For example, two entries in this semantic association map would be:

Train—Metro, Station, Rail, Railway,
Attack—Violence

The semantic map allows two semantic concepts with highly correlated meanings to be collapsed into the same dimension. This means that while stemming syntactically reduces the words 'operating' and 'operate' both to 'operat', so that they become the same (dimension is reduced from 2 to 1), the semantic map entries further reduces, e.g., the two dimensions 'Attack' and 'Violence' to one equivalent word, thus resulting dimension becomes 1.

After vector spaces have been created and dimensions further reduced a measure of the similarity between the two paragraphs being compared is established at sub-step (424). By computing the cosine of their space vectors, are explained above, a similarity score is obtained.

Finally, at sub-step (430), all compare paragraphs of the current comparable document sections are exhaustively inserted (432) next to the base paragraph returning the best similarity score, i.e., the highest cosine value. If multiple identical similarity values are found, any one of the corresponding base paragraph can be chosen to insert the compare paragraph next to it, e.g., the first one. Examples of paragraph insertions have been shown and already discussed in FIG. 3.

What is claimed is:

1. A computerized travel system for providing advices and warnings per travel destination to end-users of the travel system, comprising:

a client service module for receiving a query from an end user and delivering a merged report of travel advices and warnings for a queried travel destination;

a download and parsing module for parsing individual travel advice documents downloaded from a plurality of online reliable travel sources into cleaned documents sharing a common formatting structure including sections, sections headers and paragraphs and wherein, for each individual travel advice, tags are defined and text portions are extracted between the tags;

an algorithmic module for integrating the cleaned documents into a merged report of travel advices and warnings per travel destination wherein the integration of the cleaned documents into the merged report performed by:

i) choosing, among all the clean documents, a base document from which integration is performed;

ii) creating sections in the merged report using the section headers of the base document as section headers of the merged report;

iii) for each section of the base document extracting paragraphs from the base document and inserting said paragraphs extracted from the base document in the merged report under the section header corresponding to the section header of the section of the base document;

iv) comparing section headers of the cleaned documents other than the base document with the section headers of the base document to determine similarity values;
v) defining a similarity value threshold and defining pairs of comparable sections each made of a section of a cleaned document other than the base document and of a section of the base document and for which the similarity value is above the similarity value threshold;
vi) for each pair of comparable sections:
   comparing the paragraphs of the section of the cleaned document other than the base document with the paragraphs of the section of the base document to determine similarity scores;
   inserting the paragraphs of the section of the cleaned document other than the base document in the merged report, next to the paragraphs of the section of the base document returning the best similarity score;
a relational database for storing and retrieving all travel information and controls to operate the travel system including the cleaned documents and the merged report;
an administrative module to manage and control the building and delivery of the merged report to the end-user of the travel system.

2. The system of claim 1, wherein comparable sections are determined on the basis of contents of their section headers.

3. The system of claim 1, wherein semantically close paragraphs of comparable sections are placed next to each other in the corresponding sections of the merged reports.

4. The system of claim 3, wherein semantic similarities of clean raw document paragraphs are evaluated on the basis of a reduced set of content-bearing keywords per paragraph and wherein similarity scores are computed versus the corresponding base paragraphs.

5. The system of claim 4, wherein the insertion of the paragraphs in sections of the merged reports is performed as a function of their similarity scores.

6. The system of claim 1, wherein the algorithmic module further filters contents of any of the travel advice documents for the purpose of printing or displaying only part of the travel advices and warnings.

7. The system of claim 6, wherein filtering is performed on the basis of semantic filters including filtering of recommendations and events.

8. A method in a travel system of integrating advices and warnings from a plurality of individual travel advice documents, comprising:
   receiving, via a computer, a query for advices and warnings for a travel destination from and end-user;
   getting, via a computer, individual travel advice documents including text portions from a database of the travel system;
   providing a common formatting structure including sections, sections headers and paragraphs;
   parsing, via a computer, the individual travel advice documents, to obtain cleaned documents sharing the common formatting structure, said parsing step comprising for each individual travel advice document, the definition of tags and the extraction of text portions between the tags;
   integrating, via a computer, the cleaned documents into a merged report of travel advices and warnings for the travel destination, the integrating step including the further step of:
   i) choosing, among all the cleaned documents, a base document from which integration is performed;
   ii) creating sections in the merged report using the section headers of the base document as section headers of the merged report;
   iii) for each section of the base document, extracting paragraphs from the base document and inserting said paragraphs extracted from the base document in the merged report under the section header corresponding to the section header of the section of the base document;
   iv) comparing section headers of the cleaned documents other than the base document with the section headers of the base document to determine similarity values;
   v) defining a similarity value threshold and defining pairs of comparable sections each made of a section of a cleaned document other than the base document and of a section of the base document and for which the similarity value is above the similarity value threshold;
   vi) for each pair of comparable sections:
      comparing the paragraphs of the section of the cleaned document other than the base document with the paragraphs of the section of the base document to determine similarity scores;
      inserting the paragraphs of the section of the cleaned document other than the base document in the merged report, next to the paragraphs of the section of the base document returning the best similarity score;
   delivering, via a computer, the merged report of travel advices and warnings for the travel destination to the end-user of the travel system.

9. The method of claim 8, wherein the step of getting individual travel advice documents from the database is replaced by the steps of:
   if documents are not available or outdated in the database,
   building or updating a master table of reliable data sources of travel advices and warning;
   downloading the raw documents from the reliable data sources listed in the master table.

10. The method of claim 8, wherein the integrating step includes the further steps of:
   with respect to the base document used to produce the merged report,
   determining which sections of the cleaned raw documents are comparable on the basis of their section headers;
   comparing each paragraph contents within comparable sections, further comprising:
   identifying content-bearing keywords in current paragraph of base document;
   identifying content-bearing keywords in compared paragraph of cleaned raw document;
   identifying vector spaces for evaluating paragraph similarities;
   measuring paragraph similarities to obtain a similarity score;
   inserting the compared paragraph into the merged report as a function of its similarity score.

11. The method according to claim 8, wherein contents of any of the travel advice documents is further filtered for the purpose of printing or displaying only part of the travel advices and warnings.

12. The method of claim 11, wherein the filtering step includes filtering on the basis of semantic filters including filtering of recommendations and events.

13. A computer program stored on a computer readable storage medium, comprising computer readable code causing at least one computer to perform the method of integrating travel advices and warnings according to claim 8.

14. The system of claim 1, wherein comparable sections are determined on the basis of contents of their section headers.

15. The system of claim 1, wherein semantically close paragraphs of comparable sections are placed next to each other in the corresponding sections of the merged reports.

16. The system of claim 2, wherein semantically close paragraphs of comparable sections are placed next to each other in the corresponding sections of the merged reports.

17. The method, at claim 9, wherein contents of any of the travel advice documents is further filtered for the purpose of printing or displaying only part of the travel advices and warnings.

18. The method, at claim 10, wherein contents of any of the travel advice documents is further filtered for the purpose of printing or displaying only part of the travel advices and warnings.

19. The system of claim 1, wherein the base document is a document supplied by an embassy of a country of citizenship of the end user.

20. The method of claim 8, wherein the base document is a document supplied by an embassy of a country of citizenship of the end user.

* * * * *